(12) United States Patent
Gong et al.

(10) Patent No.: US 9,754,693 B2
(45) Date of Patent: Sep. 5, 2017

(54) LOW-TEMPERATURE SOLIDIFICATION OF RADIOACTIVE AND HAZARDOUS WASTES

(75) Inventors: Weiliang Gong, Rockville, MD (US); Werner Lutze, Chevy Chase, MD (US); Ian L. Pegg, Alexandria, VA (US)

(73) Assignee: Atkins Global Solutions, LLC, Salt Lake City, UT (US)

( * ) Notice: Subject to any disclaimer, the term of this patent is extended or adjusted under 35 U.S.C. 154(b) by 195 days.

(21) Appl. No.: 12/954,249

(22) Filed: Nov. 24, 2010

(65) Prior Publication Data

US 2011/0104792 A1 May 5, 2011

Related U.S. Application Data

(62) Division of application No. 11/364,643, filed on Feb. 28, 2006, now Pat. No. 7,855,313.

(60) Provisional application No. 60/657,008, filed on Feb. 28, 2005.

(51) Int. Cl.
*G21F 9/30* (2006.01)
*C04B 28/08* (2006.01)
*G21F 9/16* (2006.01)
*C04B 28/00* (2006.01)

(52) U.S. Cl.
CPC ............ *G21F 9/304* (2013.01); *C04B 28/006* (2013.01); *C04B 28/008* (2013.01); *C04B 28/08* (2013.01); *G21F 9/16* (2013.01); *Y02P 40/165* (2015.11); *Y02W 30/91* (2015.05); *Y02W 30/92* (2015.05); *Y02W 30/94* (2015.05)

(58) Field of Classification Search
None
See application file for complete search history.

(56) References Cited

U.S. PATENT DOCUMENTS

| | | | | |
|---|---|---|---|---|
| 2,047,614 A * | 7/1936 | Cavezzale et al. | ............ | 423/332 |
| 3,953,172 A * | 4/1976 | Shapiro et al. | ............... | 436/500 |
| 4,354,954 A * | 10/1982 | Koster | ...................... | G21F 9/36 264/0.5 |
| 4,544,499 A * | 10/1985 | Tran et al. | ...................... | 588/12 |
| 4,622,175 A * | 11/1986 | Tamata et al. | .................... | 588/4 |
| 4,661,291 A * | 4/1987 | Yamasaki et al. | .............. | 588/14 |
| 4,859,367 A * | 8/1989 | Davidovits | .................... | 588/252 |
| 5,200,165 A * | 4/1993 | Harper et al. | ................ | 423/339 |
| 5,372,729 A * | 12/1994 | Hooykaas | ..................... | 588/252 |
| 5,434,333 A * | 7/1995 | Jantzen et al. | .................... | 588/3 |
| 5,593,888 A * | 1/1997 | Glaze et al. | ............... | 435/262.5 |
| 5,626,552 A * | 5/1997 | Nomura et al. | .............. | 588/318 |
| 5,662,579 A | 9/1997 | Bickford | | |
| 5,690,833 A * | 11/1997 | Crawford et al. | ............ | 210/662 |
| 5,823,203 A * | 10/1998 | Carroll et al. | ................ | 132/200 |
| 6,242,663 B1 * | 6/2001 | Ponder et al. | ................ | 588/315 |
| 7,855,313 B2 | 12/2010 | Gong et al. | | |
| 2002/0111525 A1 * | 8/2002 | Pal et al. | ........................ | 588/13 |
| 2006/0129018 A1 * | 6/2006 | Chekhmir et al. | .............. | 588/11 |

FOREIGN PATENT DOCUMENTS

| | | | |
|---|---|---|---|
| JP | 404128699 | * | 4/1992 |
| JP | 2002068790 | * | 8/2000 |

OTHER PUBLICATIONS

Guangren, Qian, et al. "Improvement of Metakaolin on radioactive Sr and Cs immobilization of alkali-activated slag matrix". Journal of Hazardous Materials B92, 289-300 (2002).*
Hyatt, Neil, "Zeolite-Salt Occlusion: A Potential Route for the Immobilisation of Iodine-129?" The University of Birmingham (2004).
Sharp, J.H. et al., "Cementitious Systems for Encapsulation of Intermediate Level Waste," Proceedings of ICEM 03: The 9th International Conference on Radioactive Waste Management and Environmental Remediation. Examination School, Oxford England (Sep. 21-25, 2003).
Zhou Q., et al., "An Alternative to Portland Cement for Waste Encapsulation—The calcium sulfoaluminate cement system," Journal of Hazardous Materials 136 (2006) 120-129.

(Continued)

*Primary Examiner* — Melvin C Mayes
*Assistant Examiner* — Sheng H Davis
(74) *Attorney, Agent, or Firm* — Holland & Hart LLP

(57) ABSTRACT

Treatment of a radioactive waste stream is provided by adding sodium hydroxide (NaOH) and/or potassium hydroxide (KOH) together with a rapidly dissolving form of silica, e.g., fumed silica or fly ash. Alternatively, the fumed silica can be first dissolved in a NaOH/KOH solution, which is then combined with the waste solution. Adding a binder that can be a mixture of metakaolin ($Al_2O_3 \cdot 2SiO_2$), ground blast furnace slag, fly ash, or other additives. Adding an "enhancer" that can be composed of a group of additives that are used to further enhance the immobilization of heavy metals and key radionuclides such as $^{99}Tc$ and $^{129}I$. An additional step can involve simple mixing of the binder with the activator and enhancer, which can occur in the final waste form container, or in a mixing vessel prior to pumping into the final waste form container, depending on the particular application.

70 Claims, No Drawings

(56) References Cited

OTHER PUBLICATIONS

Constantino, Vera R.L., et al., Basic Properties of $Mg^{2+}{}_{1-x}Al^{3+}x$ Layered Double Hydroxides Intercalated by Carbonate, Hydroxide, Chloride, and Sulfate Anions, Dept. of Chemistry and Center for Fundamental Materials Research, Michigan State University, 883-892, Jul. 29, 1994 (10 pp.).

Gong, W., et al., DuraLith Alkali-Aluminosilicate Geopolymer Waste Form Testing for Hansford Secondary Waste, Final Report, U.S. Dept. of Energy, VSL-10R2140-1, Rev. 1, PNNL-20565, Pacific Northwest National Laboratory, May 2011 (109 pp.).

* cited by examiner

LOW-TEMPERATURE SOLIDIFICATION OF RADIOACTIVE AND HAZARDOUS WASTES

CLAIM OF PRIORITY

This application is a divisional of U.S. patent application Ser. No. 11/364,643 filed on 28 Feb. 2006, now U.S. Pat. No. 7,855,313, which application claims priority of U.S. Provisional Patent Application Ser. No. 60/657,008 entitled Low-Temperature Solidification of Radioactive and Hazardous Wastes filed 28 Feb. 2005, the disclosures of which are incorporated in their entirety, by this reference.

FIELD OF THE INVENTION

This invention is directed to a process for the low-temperature solidification of radioactive and/or hazardous wastes that produce a waste form with enhanced chemical durability. More particularly, the invention is able to retain radioactive iodine and technetium in the product material and capture them in such a manner as to render them highly resistant to subsequent aqueous leaching, as might, for example, occur on exposure to ground waters in the environment.

BACKGROUND OF THE INVENTION

Over the last 20 years geopolymerization has emerged as a potential alternative to Portland cement grouts for applications such as the immobilization of inorganic hazardous waste and, more recently, of radioactive waste. The application of geopolymer stabilization retains all of the simplicity of Portland cement grouting and is a simple one of mixing a waste stream with readily available, inexpensive, inorganic, non-flammable materials. Portland cement grouting, generally, might include the use of components such as fumed silica (silicon dioxide, amorphous fumed), metakaolin, fly ash, ordinary Portland cement, and others, depending on which compounds are not supplied by the waste in large enough quantities to make a stable waste form.

Geopolymeric materials or geopolymers are also referred to as alkali-activated aluminosilicate binders. These materials can be best described as equivalents of certain synthetic and natural zeolites, although the distinctive zeolite crystal structures are absent. Further, geopolymers are amorphous to X-rays.

The synthesis temperatures required for the formation of geopolymers typically range between 20° C. and 80° C. Structural integrity and mechanical strength are attained in a few hours, depending on the conditions of synthesis. Geopolymer waste forms lend themselves particularly to immobilization of waste streams with high alkali concentrations and acid waste streams require neutralization with sodium or potassium hydroxide. As with grouting, for optimum waste loadings, very dilute waste streams may require evaporation prior to treatment to remove the excess water.

In the radioactive waste processing industry it is desirable to engage in solidification, stabilization, and immobilization of radioactive and hazardous waste to minimize and, preferably prevent the potentially deleterious effects of these wastes on the environment. Solidification and stabilization technology is a treatment that is used to prevent or slow the release of harmful materials, such as chemicals or radioactive waste from contaminated soil, sludge, sediment, or other materials.

For example, cement-based solidification and stabilization is preformed by mixing Portland cement into the contaminated media, such as soil, sludge, or sediment to help make the waste safe for land disposal. As applied to radioactive waste, solidification and stabilization, although providing some additional radiation shielding, is principally used for physical immobilization of radioactive material. Immobilization of the radioactive material prevents release of those materials into the environment. Over time the level of radioactivity emitted from the immobilized radionuclides reduces itself through a process of radioactive decay. Therefore, solidification and stabilization allows for the contaminated material to be safely stored until radioactive decay reduces the level of radiation emitted from the treated material to an acceptable level.

When performing stabilization, solidification or immobilization, the resulting materials produced by these processes are referred to as "waste forms." The most chemically durable materials for this purpose are typically formed at high temperatures and include glass waste forms produced by vitrification and waste forms produced by various ceramic processes. However, such "thermal" processes have associated disadvantages that include relatively high costs and the tendency to volatilize certain radioactive and/or hazardous waste materials or species. As a result, off-gas treatment systems are typically required to decontaminate the gasses that are produced in such processes before the gasses can be safely released into the environment. These off-gas treatment systems produce secondary waste streams that then require treatment and, ultimately, stabilization in yet another waste form. For all of these reasons, there is a need for low-temperature waste solidification processes that are better able to retain volatile radioactive and/or hazardous species and which do not require off-gas treatment systems or require greatly simplified off-gas treatment systems, all of which can potentially result in significant cost savings. Current, low-temperature non-thermal processes systems produce material that are less chemically durable than those produced from the thermal solidification processes. Consequently, there is a need for low-temperature processes that produce waste forms with enhanced chemical durability.

Further, certain types of radioactive and hazardous wastes contain organic compounds. Since these compounds, or reactions products from the decomposition of these compounds, can be hazardous to the environment, it is also desirable to immobilize these compounds in the waste form that results from treatment of the waste. A further aspect of the present invention is to effect the immobilization of such compounds in the waste form and to reduce the extent to which such compounds are degraded to produce more hazardous or more mobile compounds, or both, either during the treatment process or in the waste form itself, or both.

Herein, we define "low-temperature" and "non-thermal" processes to be processes that operate below approximately 150° C.

This invention produces a waste form that is a type of zeolitic, alkali aluminosilicate material that is based on geopolymer chemistry. However, the process of the present invention also include novel features that serve to significantly enhance the chemical durability of the waste form over the prior art and, more particularly, serve to significantly reduce the leachability of radioactive iodine and technetium from the waste form.

Radioactive iodine and technetium, and more specifically $^{129}I$ and $^{99}Tc$, are among the major risk contributors in the environment because of their long half-lives, high mobility, and bioactivity. Radioactive iodine is a particular hazard to humans because iodine is an essential element in human diet to avoid thyroid-deficiency disease. The human body selectively extracts iodine from food, water and air, storing it mainly in the thyroid gland. Since radioactive and non-radioactive iodine are identical from a chemical viewpoint, humans and other living organisms are unable to differentiate one form of iodine from another. Studies have shown that radioactive iodine can cause fatal thyroid cancer. Therefore, the present invention can reduce the risk of storing radioactive waste that contains harmful elements such as $^{129}I$.

Further, radioactive iodine and technetium are volatile at higher temperatures and thermal processes do not adequately retain these elements in the resulting waste forms. As such, these elements can be present in significant amounts in the secondary waste streams generated from thermal processes. The low-temperature process of this invention minimizes volatilization and secondary waste production; provides a waste form with superior retention of technetium and iodine as well as heavy metals and other radioactive and/or hazardous species; and is chemically well matched to handle various types of highly alkaline salt waste streams.

DETAILED DESCRIPTION

The major steps of geopolymerization as used in this invention may include: complete or partial dissolution of precursor materials through the action of hydroxyl ions; spatial orientation of mobile precursor groups and restructuring of alkali poly-silicates; and, re-precipitation and hardening of the material into an inorganic polymeric structure.

The product of geoploymerization processes, while superficially similar to conventional cements or grouts formed from ordinary Portland cement, are chemically and structurally distinct. Geopolymer materials are generally faster setting, stronger, and more chemically durable than conventional cements. Since the process of this invention can represent a significant enhancement of conventional geopolymer technology, it also can contain these advantages.

In the process of this invention, the waste composition is tailored by the use of specific additives and/or pre-treatment processes and specific precursors are used as ingredients in order to achieve the enhanced waste form properties. The waste stream is tailored by adding sodium hydroxide (NaOH) and/or potassium hydroxide (KOH) together with a rapidly dissolving form of silica, e.g., fumed silica or fly ash. Alternatively, the fumed silica can be first dissolved in a NaOH/KOH solution, which is then combined with the waste solution. We refer to this solution as the "activator." The activator is one of three components that can be used to make the waste form of the present invention. The second component that can be used is referred to as the "binder." The binder can be a mixture of metakaolin ($Al_2O_3 \cdot 2SiO_2$), ground blast furnace slag, fly ash, or other additives. The third component that can be used is referred to as the "enhancer." The enhancer can be composed of a group of additives that are used to further enhance the immobilization of heavy metals and key radionuclides such as 99Tc and 129I. An additional step can involve simple mixing of the binder with the activator and enhancer, which can occur in the final waste form container, or in a mixing vessel prior to pumping into the final waste form container, depending on the particular application.

The use of ground blast furnace slag in the process of the invention as part of the binder serves various beneficial functions, including improvement of both mechanical and chemical durability of the waste form. The blast furnace slag contains several percent sulfides, which help establish a low redox potential and support reduction and precipitation of technetium. In alkali-activated furnace slag, hydrotalcite is the important reaction product, which selectively absorbs anions such as I—, IO3- and TcO4-. Several types of slag such as copper smelter slag (Fe2+ enriched) bear similar functions as blast furnace slag and additionally support precipitation of iodine due to the presence of copper. Heavy metals precipitate either as insoluble hydroxides or as sulfides. Radionuclides, such as 99Tc and 129I and others, heavy metals, and various salts are then encapsulated in the matrix of this invention, most likely in mesophases and durable alkali aluminosilicate polymers, supporting long-term fixation of immobilized species.

The enhancers can be selected based on specific radionuclides and hazardous species that are present in the waste. Herein we further disclose as part of this invention specific enhancers for use in the process of this invention for the treatment of waste streams for which the immobilization of radioactive iodine and technetium are of particular concern. These enhancers can include:

soluble salts of metals such as Ag and Cu and/or metal sulfides, such as $Ag_2S$, $Cu_2S$, FeS (mackinawite), can be added to precipitate iodine and technetium as highly insoluble compounds that are solidified as part of the matrix of this invention;

green rust is a layered $Fe^{2+}$-$Fe^{3+}$ hydroxide consisting of alternating, positively charged hydroxide layers and hydrated anion layers. This enhancer absorbs TcO4- and subsequently reduces it to insoluble $TcO_2 \cdot nH_2O$. Again, the resulting products are solidified as part of the matrix of the present invention;

layered double hydroxides (LDH) can also be used as enhancers by acting as effective inorganic anionic ion exchangers. LDH is similar to hydrotalcite in structure. The chemical compositions of the family of LDH compounds are described by the formula, $[M^{2+}_{1-x}M^{3+}_x(OH)_2]^{x+}X^{n-}_{x/n} \cdot nH_2O$ (where $M^{2+}$=$Mg^{2+}$, $Zn^{2+}$, $N^{2+}$, $Co^{2+}$, $Fe^{2+}$ and $M^{3+}$=$Al^{3+}$, $Cr^{3+}$, $Fe^{3+}$, or $Bi^{3+}$). Structurally, LDHs can be described as positively charged layers of $M(OH)_6$ edge-sharing octahedra, with the interlamellar space being occupied by neutralizing Xn- anions and water. These anion species can be readily ion exchanged. LDHs activated by calcination have a higher sorption capacity. Re-hydration results in recovery of the LDH structures. Again, the resulting products are solidified as part of the matrix of the present invention.

Certain layered bismuth hydroxides such as $BiPbO_2NO_3$ can effectively absorb iodine and can also be employed as an enhancer. Again, the resulting products are solidified as part of the matrix of the present invention.

Mesoporous and microporous $MPO_x$ (M=Ti, Al, Zr) are inorganic anionic ion exchanger with highly regular periodic (ordered) nanopore structure and very large surface areas (e.g., up to 1000 m2/g), which can effectively sequester iodine and technetium, as well as other species. Mesoporous $MPO_x$ enhancers can have extremely high capacity and decontamination factors of up to 105; both features are very desirable properties for an enhancer in terms of minimizing the amount that is required in the process of the present invention and, therefore, the overall treatment cost. The mesostructures of these materials (e.g. pore size, volume, and shape) and composition can be controlled by manipulating the system chemistry, e.g., type of templates, type of inorganic sources, pH, aging time, temperature, concentration, etc. Again, the resulting products are solidified as part of the matrix of the present invention.

The pore surfaces of mesoporous silica can be modified with certain organic functional groups such as quaternary alkylammonium and aminopropyl to selectively remove radionuclides such as iodine and technetium. Mesoporous silica can be doped with P, Zr, and Al to improve resistance to attack by alkaline solutions. Again, the resulting products are solidified as part of the matrix of the present invention;

Certain zeolitic materials (e.g., mordenite) can be impregnated with silver and the resulting material is an effective getter for iodine. Again, the resulting products are solidified as part of the matrix of the present invention; the zeolitic nature of this material makes it particularly compatible with the geopolymer structure of the waste form of the present invention.

Porous glass ion exchange media that are selective for iodine and/or technetium can also be used as enhancers. Again, the resulting products are solidified as part of the matrix of the present invention.

The enhancers are among the ingredients that can be used to produce the waste form of the present invention and can become part of the final product material. In an alternative embodiment of the present invention, the same enhancers can be used to remove iodine and/or technetium from the waste stream in a pre-treatment step or steps. The pre-treated waste can then be solidified in a matrix of the present invention. The spent enhancer materials, loaded with iodine and/or technetium, are then stabilized in a separate step into a separate waste form of the present invention or, alternatively, into some other waste form.

Certain waste streams may require pretreatment prior to immobilization with the process of the present invention. As an example, high nitrate concentrations in the waste stream may limit the waste loading unnecessarily; removal of some or all of the nitrate in a pre-treatment process can therefore increase the waste loadings that are achievable thereby potentially reducing the overall cost. Herein we further disclose as part of this invention specific pre-treatment processes to reduce the nitrate content of the waste prior to its solidification in a matrix of the present invention. These pre-treatment processes can include microbially mediated processes in which bacteria reduce nitrate to nitrogen, thereby decreasing the nitrate concentration in the waste. Depending on the waste stream composition, this may require dilution of the initial waste stream to decrease the nitrate concentration into the range that is suitable for metabolization by the bacteria. After denitration, the solution could be re-concentrated by evaporation. In addition, adjustment of pH may be necessary if a waste stream is too alkaline or too acid for the bacteria to be active. In solutions with high salt concentrations, halophylic bacteria may be used for denitration or electrochemical reduction of nitrate in solution. The pre-treated waste resulting from any of these processes would then be solidified as a waste form of the present invention in the same fashion as described above.

Further, waste streams can contain tetraphenyl borate compounds (e.g., as the sodium, potassium, ammonium, or other salts) which are often employed in radioactive waste treatment processes to precipitate radioactive cesium isotopes. Cesium tetraphenyl borate is very insoluble and, as a result, can be removed from the waste stream by simple solid-liquid separation processes (e.g., filtration, sedimentation, etc.). Treatment of radioactive waste streams in this way therefore provides a means of removing radioactive cesium and thereby partially decontaminating the waste stream. Since cesium is often a major contributor to the total radioactivity, such processes can effect a significant reduction in overall radioactivity. Such treatment processes have been known for many years. However, despite their attractiveness, disposition of the cesium-enriched material, which typically contains large amounts of tetraphenyl borate, has proved to be troublesome. Unless the solution pH is maintained high, the tetraphenyl borate molecule is easily and progressively hydrolyzed to triphenyl borate, diphenyl borate, and ultimately, boric acid, producing a benzene molecule in each step. Benzene is a very hazardous and highly regulated organic compound, which is also much more volatile than are any of the precursor phenyl borate compounds. Even at relatively high pH, similar hydrolysis or decomposition can occur if the temperature of the liquid is increased, with the rate of decomposition becoming appreciable at temperatures above about 40° C., depending on the pH and other aspects of the liquid composition. Again, these decomposition processes result in the generation of benzene, which is highly undesirable. As a specific example of this problem, significant quantities of waste generated at the US Department of Energy's Savannah River site by cesium extraction using tetraphenyl borate precipitation are being held in storage until suitable treatment and disposal paths can be identified. The original plan to process this material by vitrification (a high temperature process in which the waste is converted into glass) has been determined to be unacceptable due to safety concerns relating to benzene generation and flammability.

In view of the concerns with respect to benzene generation from tetraphenyl borate containing wastes, it is natural to consider low-temperature, non-thermal processes for treatment of such wastes. As discussed earlier, solidification using ordinary Portland cement based materials is one of the most widely used methods of low-temperature stabilization. However, cement stabilization involves exothermic curing reactions. As a result, it is commonplace for the waste-cement mixture to achieve temperatures of well above 40° C., particularly when the material is present in large quantities such that heat loss is inhibited and high internal temperatures are maintained.

Therefore, a further aspect of the present invention relates to the immobilization of hazardous and radioactive waste that contain organic compounds and, more particularly, tetraphenyl borate and related compounds. The chemistry involved in the present invention is such that the solution pH is maintained at very high levels, typically well above pH 10 and more typically in the pH 12-14 range, because it is necessary to affect the dissolution of silica in order to bring about the required geopolymerization reactions on which the process is based. As a result, the underlying chemistry and prevailing conditions of the present invention are well-suited to the stabilization of organic compounds that are subject to decomposition at lower pH, such as by acid hydrolysis, as is the case for tetratphenyl borate compounds. Furthermore, since the curing reactions that occur in the present invention are vastly less exothermic than are those for cement stabilization, the temperature rise can be maintained at very low levels and, more particularly, below about 40° C. These features of the present invention serve to chemically and thermally ensure the stabilization of compounds such as tetraphenyl borate, thereby minimizing the generation of decomposition products such as benzene, and allowing the organic material to be immobilized in the solidified waste form. Consequently, significant advantages accrue over processes such as cement stabilization because, for example, benzene generation during treatment is minimized thereby greatly simplifying the treatment process and benzene generation from the waste form during storage is minimized greatly simplifying the disposal facility.

Although very little heat is released during the curing processes that occur in the present invention, some of the preceding steps can be quite exothermic. In particular, the dissolution of the alkali source (e.g., potassium hydroxide, sodium hydroxide, etc.) is very exothermic. Accordingly, a further aspect of this invention involves the preparation of the precursor solutions and, in particular, the activator, in vessels that allow for either active or passive cooling such that the solution is brought back to a temperature comparable to that of the waste stream that is to be treated prior to combining these streams.

While a preferred embodiment of the invention has been described using specific terms, such description is for illustrative purposes only, and it is to be understood that changes and variations may be made without departing from the spirit or scope of the following claims.

What is claimed is:

1. A method for immobilizing a radioactive waste stream comprising:
    adding sodium hydroxide and/or potassium hydroxide to the radioactive waste stream;
    adding dissolving silica to the radioactive waste stream;
    adding a binder to the radioactive waste stream, the binder comprising at least two of the following: metakaolin, fly ash, or blast furnace slag;
    adding an enhancer to the radioactive waste stream, the enhancer comprising at least one of:
      a porous glass;
      a layered double hydroxide;
      a layered bismuth hydroxide;
      a zeolitic material impregnated with silver;
      a mesoporous silica doped from the group consisting of P, Zr, and Al;
      a mesoporous $MPO_x$ where M is selected from the group consisting of Ti, Al, or Zr; or
      $[M^{2+}_{1-x}M^{3+}x(CH)_2]^{x+}X^{n-}_{x/n}nH_2O$ where $M^{2+}$ is selected from the group consisting of $Mg^{2+}$, $Zn^{2+}$, $N^{2+}$, $Co^{2+}$ or $Fe^{2+}$ and $M^{3+}$ is selected from the group consisting of $Al^{3+}$, $Cr^{3+}$, $Fe^{3+}$ or $Bi^{3+}$; and
    solidifying the radioactive waste stream to form a geopolymeric waste form without the process temperature of the radioactive waste stream exceeding or equaling 150° C.;
    wherein the enhancer immobilizes one or more heavy metals and/or radionuclides in the radioactive waste stream using a mechanism that is separate from solidifying the waste stream.

2. The method of claim 1 wherein the enhancer immobilizes the one or more heavy metals and/or radionuclides in the waste stream by precipitation, absorption, and/or ion exchange.

3. The method of claim 1 wherein the radioactive waste stream comprises $^{129}I$.

4. The method of claim 1 where the radioactive waste stream comprises $^{99}Tc$.

5. The method of claim 1 wherein the dissolving silica comprises fumed silica.

6. The method of claim 5 including the step of dissolving the fumed silica in the sodium hydroxide and/or potassium hydroxide prior to adding the sodium hydroxide and/or potassium hydroxide to the waste stream.

7. The method of claim 1 wherein the binder includes metakaolin.

8. The method of claim 1 wherein the binder includes fly ash.

9. The method of claim 1 wherein the binder includes ground blast furnace slag.

10. The method of claim 9 wherein the ground blast furnace slag contains between 0.1 and 9 percent sulfides.

11. The method of claim 10 wherein the blast furnace slag is alkali-activated.

12. The method of claim 1 including the step of mixing the binder with the sodium hydroxide and/or potassium hydroxide and the enhancer prior to adding the sodium hydroxide and/or potassium hydroxide, binder, and enhancer to the radioactive waste stream.

13. The method of claim 1 wherein the binders comprises copper smelter slag.

14. The method of claim 1 wherein the enhancer comprises soluble salts of metals.

15. The method of claim 1 wherein the enhancer comprises at least one material selected from the group consisting of Ag, Cu, $Ag_2S$, $Cu_2S$ or FeS.

16. The method of claim 1 wherein the enhancer comprises green rust.

17. The method of claim 1 wherein the enhancer comprises at least one material selected from the group of $Fe^{2+}$ or $Fe^{3+}$.

18. The method of claim 1 wherein the enhancer comprises the layered double hydroxide.

19. The method of claim 18 wherein the layered double hydroxide is activated by calcination.

20. The method of claim 1 wherein the enhancer comprises the $[M^{2+}_{1-x}M^{3+}x(CH)_2]^{x+}X^{n-}_{x/n}nH_2O$.

21. The method of claim 1 wherein the enhancer comprises the layered bismuth hydroxide.

22. The method of claim 21 wherein the layered bismuth hydroxide is $BiPbO_2NO_3$.

23. The method of claim 1 wherein the enhancer comprises the mesoporous $MPO_x$.

24. The method of claim 1 wherein the enhancer comprises the mesoporous silica.

25. The method of claim 1 wherein the enhancer comprises the zeolitic material.

26. The method of claim 1 wherein the enhancer comprises the porous glass.

27. The method of claim 1 wherein the enhancer is added to the waste stream prior to adding the sodium hydroxide and/or potassium hydroxide and the binder.

28. The method of claim 1 including the step of performing microbial mediation on the waste stream to reduce nitrate to nitrogen prior to adding the sodium hydroxide and/or potassium hydroxide, the binder and the enhancer.

29. The method of claim 28 including the step of diluting the waste stream prior to performing microbial mediation.

30. The method of claim 29 including the step of evaporating the waste stream to reconcentrate the waste stream.

31. The method of claim 28 including the step of adjusting the pH of the waste stream to allow for microbial mediation.

32. The method of claim 28 wherein the microbial mediation occurs using halophylic bacteria.

33. A method for immobilizing a radioactive waste stream comprising:
    adding sodium hydroxide and/or potassium hydroxide to the radioactive waste stream;
    adding dissolving silica to the radioactive waste stream;
    adding a binder to the radioactive waste stream, the binder comprising at least two of the following: metakaolin, fly ash, or blast furnace slag;
    adding an enhancer to the radioactive waste stream that immobilizes one or more heavy metals and/or radionuclides in the radioactive waste stream by precipitation, absorption, and/or ion exchange mechanisms, the enhancer comprising at least one of:
a porous glass;
a layered double hydroxide;
a layered bismuth hydroxide;
a zeolitic material impregnated with silver;
a mesoporous silica doped from the group consisting of P, Zr, and Al;
a mesoporous $MPO_x$ where M is selected from the group consisting of Ti, Al, or Zr; or
$[M^{2+}_{1-x}M^{3+}x(CH)]^{x+}X''^{-}_{x/n}nH_2O$ where $M^{2+}$ is selected from the group consisting of $Mg^{2+}$, $Zn^{2+}$, $N^{2+}$, $CO^{2+}$ or $Fe^{2+}$ and $M^{3+}$ is selected from the group consisting of $Al^{3+}$, $Cr^{3+}$, $Fe^{3+}$ or $Bi^{3+}$; and
solidifying the radioactive waste stream to form an inorganic polymeric waste form without the process temperature of the radioactive waste stream exceeding or equaling 150° C.

34. The method of claim 33 including the step of providing a radioactive waste stream.

35. The method of claim 34 wherein the radioactive waste stream contains $^{129}I$.

36. The method of claim 34 where the radioactive waste stream contains $^{99}Tc$.

37. The method of claim 33 wherein the dissolving silica comprises fumed silica.

38. The method of claim 37 including the step of dissolving the fumed silica in the sodium hydroxide and/or potassium hydroxide prior to adding the sodium hydroxide and/or potassium hydroxide to the waste stream.

39. The method of claim 33 wherein the binder includes metakaolin.

40. The method of claim 33 wherein the binder includes ground blast furnace slag.

41. The method of claim 40 wherein the ground blast furnace slag is alkali-activated.

42. The method of claim 40 wherein the ground blast furnace slag contains between 0.1 and 9 percent sulfides.

43. The method of claim 33 wherein the binder includes fly ash.

44. The method of claim 33 including the step of mixing the binder with the sodium hydroxide and/or potassium hydroxide and the enhancer prior to adding the sodium hydroxide and/or potassium hydroxide, binder, and enhancer to the radioactive waste stream.

45. The method of claim 33 wherein the binder comprises copper smelter slag.

46. The method of claim 33 wherein the enhancer comprises soluble salts of metals.

47. The method of claim 33 wherein the enhancer comprises at least one material selected from the group consisting of Ag, Cu, $Ag_2S$, $Cu_2S$ or FeS.

48. The method of claim 33 wherein the enhancer comprises green rust.

49. The method of claim 33 wherein the enhancer comprises at least one material selected from the group consisting of $Fe^{2+}$ or $Fe^{3+}$.

50. The method of claim 33 wherein the enhancer comprises the layered double hydroxide.

51. The method of claim 50 wherein the layered double hydroxide is activated by calcination.

52. The method of claim 33 wherein the enhancer comprises the $[M^{2+}_{1-x}M^{3+}x(CH)_2]^{x+}X''^{-}_{x/n}nH_2O$.

53. The method of claim 33 wherein the enhancer comprises the layered bismuth hydroxide.

54. The method of claim 53 wherein the layered bismuth hydroxide is $BiPbO_2NO_3$.

55. The method of claim 33 wherein the enhancer comprises the mesoporous $MPO_x$.

56. The method of claim 33 wherein the enhancer comprises the mesoporous silica.

57. The method of claim 33 wherein the enhancer comprises the zeolitic material.

58. The method of claim 33 wherein the enhancer comprises the porous glass.

59. The method of claim 33 wherein the enhancer is added to the waste stream prior to adding the sodium hydroxide and/or potassium hydroxide and the binder.

60. The method of claim 33 including the step of performing microbial mediation on the waste stream to reduce nitrate to nitrogen prior to adding the sodium hydroxide and/or potassium hydroxide, the binder and the enhancer.

61. The method of claim 60 including the step of diluting the waste stream prior to performing microbial mediation.

62. The method of claim 61 including the step of evaporating the waste stream to reconcentrate the waste stream after performing the step of microbial mediation.

63. The method of claim 60 including the step of adjusting the pH of the waste stream to allow for microbial mediation.

64. The method of claim 60 wherein the microbial mediation occurs using halophylic bacteria.

65. A method for immobilizing a radioactive waste stream comprising:
adding sodium hydroxide and/or potassium hydroxide to the radioactive waste stream; adding dissolving silica to the radioactive waste stream;
adding a binder to the radioactive waste stream, the binder comprising at least two of the following: metakaolin, fly ash, or blast furnace slag;
adding an enhancer to the radioactive waste stream; and
solidifying the radioactive waste stream to form a geopolymeric waste form without the process temperature of the radioactive waste stream exceeding or equaling 150° C.;
wherein the enhancer immobilizes one or more heavy metals and/or radionuclides in the radioactive waste stream using a mechanism that is separate from solidifying the waste stream; and
wherein the binder also comprises copper smelter slag.

66. The method of claim 65 wherein the enhancer comprises at least one of:
a porous glass;
a layered double hydroxide;
a layered bismuth hydroxide;
a zeolitic material impregnated with silver;
a mesoporous silica doped from the group consisting of P, Zr, and Al;
a mesoporous $MPO_x$ where M is selected from the group consisting of Ti, Al, or Zr; or
$[M^{2+}_{1-x}M^{3+}x(CH)_2]^{x+}X''^{-}_{x/n}nH_2O$ where $M^{2+}$ is selected from the group consisting of $Mg^{2+}$, $Zn^{2+}$, $N^{2+}$, $Co^{2+}$ or $Fe^{2+}$ and $M^{3+}$ is selected from the group consisting of $Al^{3+}$, $Cr^{3+}$, $Fe^{3+}$ or $Bi^{3+}$.

67. The method of claim 65 wherein the radioactive waste stream comprises at least one of $^{129}I$ or $^{99}Tc$.

68. A method for immobilizing a radioactive waste stream comprising: adding sodium hydroxide and/or potassium hydroxide to the radioactive waste stream; adding dissolving silica to the radioactive waste stream;
adding a binder to the radioactive waste stream, the binder comprising at least two of the following: metakaolin, fly ash, or blast furnace slag;
adding an enhancer to the radioactive waste stream that immobilizes one or more heavy metals and/or radionuclides in the radioactive waste stream by precipitation, absorption, and/or ion exchange mechanisms; and solidifying the radioactive waste stream to form an inorganic polymeric waste form without the process temperature of the radioactive waste stream exceeding or equaling 150° C.;

wherein the binder also comprises copper smelter slag.

69. The method of claim 68 wherein the enhancer comprises at least one of:

a porous glass;

a layered double hydroxide;

a layered bismuth hydroxide;

a zeolitic material impregnated with silver;

a mesoporous silica doped from the group consisting of P, Zr, and Al;

a mesoporous $MPO_x$ where M is selected from the group consisting of Ti, Al, or Zr; or $[M^{2+}_{1-x}M^{3+}x(CH)_2]^{x+}X^{n-}_{x/n}nH_2O$ where $M^{2+}$ is selected from the group consisting of $Mg^{2+}$, $Zn^{2+}$, $N^{2+}$, $Co^{2+}$ or $Fe^{2+}$ and $M^{3+}$ is selected from the group consisting of $Al^{3+}$, $Cr^{3+}$, $Fe^{3+}$ or $Bi^{3+}$.

70. The method of claim 68 wherein the radioactive waste stream comprises at least one of $^{129}I$ or $^{99}Tc$.

* * * * *